(12) United States Patent
Park

(10) Patent No.: US 6,487,391 B1
(45) Date of Patent: Nov. 26, 2002

(54) METHOD AND APPARATUS FOR SELECTIVELY RECEIVING A SATELLITE BROADCAST SIGNAL OR A CABLE TELEVISION SIGNAL

(75) Inventor: Young-Rok Park, Seoul (KR)

(73) Assignee: Daewoo Electronics Co., Ltd., Seoul (KR)

( * ) Notice: Subject to any disclaimer, the term of this patent is extended or adjusted under 35 U.S.C. 154(b) by 0 days.

(21) Appl. No.: 09/064,873

(22) Filed: Apr. 23, 1998

(30) Foreign Application Priority Data

May 30, 1997 (KR) .......................... 97-22211
May 30, 1997 (KR) .......................... 97-22212

(51) Int. Cl.⁷ ..................... H04N 7/20; H04N 7/173; H04N 7/16; H04B 7/185; H04H 1/00
(52) U.S. Cl. ..................... 455/3.02; 725/68; 725/70; 725/131; 725/139; 725/151; 725/100; 725/85; 725/69; 725/133; 725/141; 725/153; 725/71; 455/3.03; 455/130; 455/131; 455/277.1; 455/277.2; 455/179.1; 455/180.1; 455/188.1; 455/427; 455/428; 455/12.1; 455/550; 455/77; 455/87; 455/88; 455/93; 455/425
(58) Field of Search ...................... 725/68, 70–71, 725/100, 131, 139, 151, 85, 69, 133, 141, 153; 455/550, 427–428, 12.1, 77, 87–88, 93, 425, 3.02, 3.03, 130–131, 277.1–277.2, 179.1, 180.1, 188.1

(56) References Cited

U.S. PATENT DOCUMENTS

| | | | |
|---|---|---|---|
| 4,939,789 A | * | 7/1990 | Sakashita et al. ........... 455/260 |
| 5,010,400 A | | 4/1991 | Oto |
| 5,212,824 A | * | 5/1993 | Mishima et al. ......... 455/188.1 |
| 5,293,633 A | * | 3/1994 | Robbins .................... 455/3.1 |
| 5,708,963 A | * | 1/1998 | Mobley et al. ............ 455/12.1 |
| 5,898,455 A | * | 4/1999 | Barakat et al. ................ 348/6 |
| 5,926,744 A | * | 7/1999 | Fukuzawa et al. ............ 45/3.2 |
| 6,308,056 B1 | * | 10/2001 | Abe et al. .................. 455/301 |

FOREIGN PATENT DOCUMENTS

EP  0408066  1/1991

* cited by examiner

Primary Examiner—Andrew Faile
Assistant Examiner—Son P Huynh
(74) Attorney, Agent, or Firm—Pennie & Edmonds LLP

(57) ABSTRACT

The present invention provides an improved receiver capable of receiving either a satellite broadcast signal or a cable TV signal associated with a TV. The inventive receiver comprises a first BPF for filtering received broadcast signals, a first local oscillator for generating a first oscillation signal, a first mixer for generating a first IF signal, a SAW filter producing a waveformed band signal, a second local oscillator, for generating a second and a third oscillation signal, a second mixer for generating a second and a third IF signal, a switching block for switching the second and the third IF signal, a second BPF for producing a baseband channel signal selected from the cable TV signal, a first LPF for producing a baseband I signal of satellite broadcast channel, a shifter for shifting a phase of the third IF signal, a third mixer for generating a phase-shifted third oscillation signal, and a second LPF for producing a baseband Q signal of satellite broadcast channel.

20 Claims, 2 Drawing Sheets

METHOD AND APPARATUS FOR SELECTIVELY RECEIVING A SATELLITE BROADCAST SIGNAL OR A CABLE TELEVISION SIGNAL

FIELD OF THE INVENTION

The present invention relates to a broadcast signal receiving system; and, more particularly, to an improved apparatus which is capable of selectively receiving either a satellite broadcast signal or a cable television signal.

BACKGROUND OF THE PRIOR ART

Broadcasting systems such as satellite broadcasting, cable television (TV) and the like, have been popularized with the rapid development of new media in recent years.

The satellite broadcasting system, using a satellite positioned at several hundred kilometers high above the earth, is capable of transmitting a broadcast signal to much wider area than other broadcasting systems.

Typically, the satellite broadcasting system transmits a broadcast signal of frequency in the range of 11.7–12.2 GHz having a number of channel signals. The satellite broadcast signal transmitted is received by a low noise blockdown converter (LNBC) mounted in a parabolic antenna and the satellite broadcast signal is converted to a radio frequency (RF) signal in the range of 950–2050 MHz to allow following signal process, e.g., tuning a certain channel signal. The converted RF signal is applied to a tuner mounted in a satellite broadcast signal receiver associated with a TV set. The satellite broadcast signal receiver equipped with the tuner having a tuning frequency in the range of 950–2050 MHz is known to tune and to receive a certain channel signal from the converted RF signal. Typically, each of the channel signals contained in the converted RF signal has a 32 MHz bandwidth.

FIG. 1 shows a schematic block diagram of a conventional satellite broadcast signal receiver. The satellite broadcast signal receiver includes two amplifiers 101, 109, a bandpass filter (BPF) 103, a first and a second local oscillators 105 and 115, a first, a second and a third mixers 107, 119 and 121, a surface acoustic wave (SAW) filter 111, an automatic gain controller (AGC) 113, a shifter 117, and a first and a second low pass filters (LPF's) 123 and 125.

The RF signal converted by a LNBC (not shown) described above is applied to the amplifier 101 and amplified therein to a predetermined level and then is fed to the BPF 103 having a bandpass filtering frequency in the range of 950–2050 MHz. The BPF 103 filters the RF signal with the bandpass filtering frequency in order to eliminate noises contained in the RF signal, and an output of the BPF 103 is fed to the first mixer 107. Meanwhile, the first local oscillator 105 having a variable oscillation frequency in the range of 1429–2530 MHz generates a certain oscillation signal for tuning a desired channel signal controlled by an oscillation control signal from a controller (not shown), e.g., microprocessor incorporated in the receiver, and provides same to the first mixer 107. The first mixer 107 mixes the output signal from the BPF 103 with the oscillation signal from the first local oscillator 105 to generate a first intermediate frequency (IF) signal of about 479.5 MHz. Subsequently, the SAW filter 111 receives the output signal from the first mixer 107 through the amplifier 109 and generates a waveformed channel signal having about 32 MHz bandwidth. The AGC 113 automatically controls a gain of the channel signal from the SAW filter 111 based on a gain control signal from a following processor (not shown), e.g., video amplifier, for providing a fixed level of video signal at a output of video detector (not shown), and outputs the gain controlled channel signal to the second and the third mixers 119 and 121.

In the meantime, the second local oscillator 115 generates a fixed oscillation signal of, e.g., 479.5 MHz, to the second mixer 119 and the shifter 117. The second mixer 119 mixes the output signal from the AGC 113 with the fixed oscillation signal from the second local oscillator 115 to detect a second IF signal of, e.g. 0 MHz, and provides the second IF signal to the first LPF 123. The shifter 117 shifts the phase of the fixed oscillation signal by 90° and outputs the shifted oscillation signal to the third mixer 121. The third mixer 121 mixes the output signal from the AGC 113 with the phase-shifted oscillation signal from the shifter 117 to detect a phase-shifted IF signal of 0 MHz and provides same to the second LPF 125.

Finally, the first LPF 123 filters the output signal of the second mixer 119 with a predetermined cut-off frequency to thereby produce a 16 MHz baseband I signal and the second LPF 125 filters the output signal of the third mixer 121 with the predetermined cut-off frequency to thereby produce a 16 MHz baseband Q signal. The baseband I and Q signals may be used to demodulate them for visual display in a following processor (not shown).

On the other hand, as well known in the art, the cable TV broadcasting system transmits a cable TV signal of, e.g., 54–860 MHz bandwidth through a coaxial cable to a cable TV signal receiver associated with a TV set. The cable TV signal also consists of a number of channel signals, each of them having 6 MHz bandwidth. Moreover, the cable TV signal receiver includes a BPF, a mixer, a local oscillator, a SAW filter, and the like, which are similar to the components of the satellite broadcast signal receiver.

However, to receive the satellite broadcast signal and the cable TV signal, as described above, both the satellite broadcast signal receiver and cable TV receiver are used in spite of the similarity in a structure thereof, thereby resulting in a complexity in the structure and a cost-consuming.

SUMMARY OF THE INVENTION

It is, therefore, a primary object of the present invention to provide a method and apparatus for selectively receiving either a satellite signal or a cable TV signal.

In accordance with one aspect of the present invention, there is provided a method for selectively receiving a satellite broadcast signal or a cable television (TV) signal, the method comprising the steps of:

(a) generating a first oscillation signal of a first predetermined oscillation frequency in response to a first oscillation control signal which is issued by a controller when a channel to be tuned to is selected by a user;

(b) receiving the first oscillation signal and either one of the satellite broadcast signal and the cable TV signal and mixing the first oscillation signal with either one of the satellite signal and cable TV signal to provide a first mixed signal having a first intermediate frequency (IF) signal;

(c) filtering the first mixed signal with a first predetermined filtering frequency to produce a waveformed band signal;

(d) selectively generating a second oscillation signal of a second predetermined oscillation frequency or a third oscillation signal of a third predetermined oscillation frequency in response to a second oscillation control signal which is issued by the controller when a broadcast mode signal representing a type of the broadcast signal to tune to, either the satellite broadcast signal or the cable TV signal, is selected by the user;

(e) receiving the waveformed band signal and either the second or the third oscillation signal and mixing the waveformed band signal with either the second or the third oscillation signal to output either a second mixed signal having a second IF signal or a third mixed signal having a third IF signal;

(f) in response to the broadcast mode signal, selectively filtering the second mixed signal with a second or a third predetermined filtering frequency to obtain a channel signal of the cable TV signal or a baseband I signal of the satellite broadcast signal which corresponds to the selected channel; and (g) shifting a phase of the third oscillation signal by a predetermined degrees to issue a phase-shifted third oscillation signal and mixing the waveformed band signal with the phase-shifted third oscillation signal to generate a phase-shifted mixed signal having a phase-shifted third IF signal and filtering the phase-shifted mixed signal with the third predetermined filtering frequency to obtain a baseband Q signal of the satellite broadcast signal corresponding to the selected channel.

In accordance with another aspect of the present invention, there is provided an apparatus for selectively receiving a satellite broadcast signal or a cable television (TV) signal, the apparatus comprising:

means for generating a first oscillation signal of a first predetermined oscillation frequency in response to a first oscillation control signal which is issued by a controller when a channel to be tuned to is selected by a user;

means for receiving the first oscillation signal and either one of the satellite broadcast signal and the cable TV signal and mixing the first oscillation signal with either one of the satellite signal and cable TV signal to provide a first mixed signal having a first intermediate frequency (IF) signal;

means for filtering the first mixed signal with a first predetermined filtering frequency to produce a waveformed band signal;

means for selectively generating a second oscillation signal of a second predetermined oscillation frequency or a third oscillation signal of a third predetermined oscillation frequency in response to a second oscillation control signal which is issued by the controller when a broadcast mode signal representing a type of the broadcast signal to tune to, either the satellite broadcast signal or the cable TV signal, is selected by the user;

means for receiving the waveformed band signal and either the second or the third oscillation signal and mixing the waveformed band signal with either the second or the third oscillation signal to generate either a second mixed signal having a second IF signal or a third mixed signal having a third IF signal;

means, in response to the broadcast mode signal, for selectively filtering the second mixed signal with a second or a third predetermined filtering frequency to obtain a channel signal of the cable TV signal or a baseband I signal of the satellite broadcast signal which corresponds to the selected channel; and means for shifting a phase of the third oscillation signal by a predetermined degrees to issue a phase-shifted third oscillation signal and mixing the waveformed band signal with the phase-shifted third oscillation signal to generate a phase-shifted mixed signal having a phase-shifted third IF signal and filtering the phase-shifted mixed signal with the third predetermined filtering frequency to obtain a baseband Q signal of the satellite broadcast signal corresponding to the selected channel.

BRIEF DESCRIPTION OF THE DRAWINGS

The above and other object and features of the present invention will become apparent from the following description of preferred embodiment given in conjunction with the accompanying drawings, in which.

DETAILED DESCRIPTION OF THE INVENTION

Figure 1:
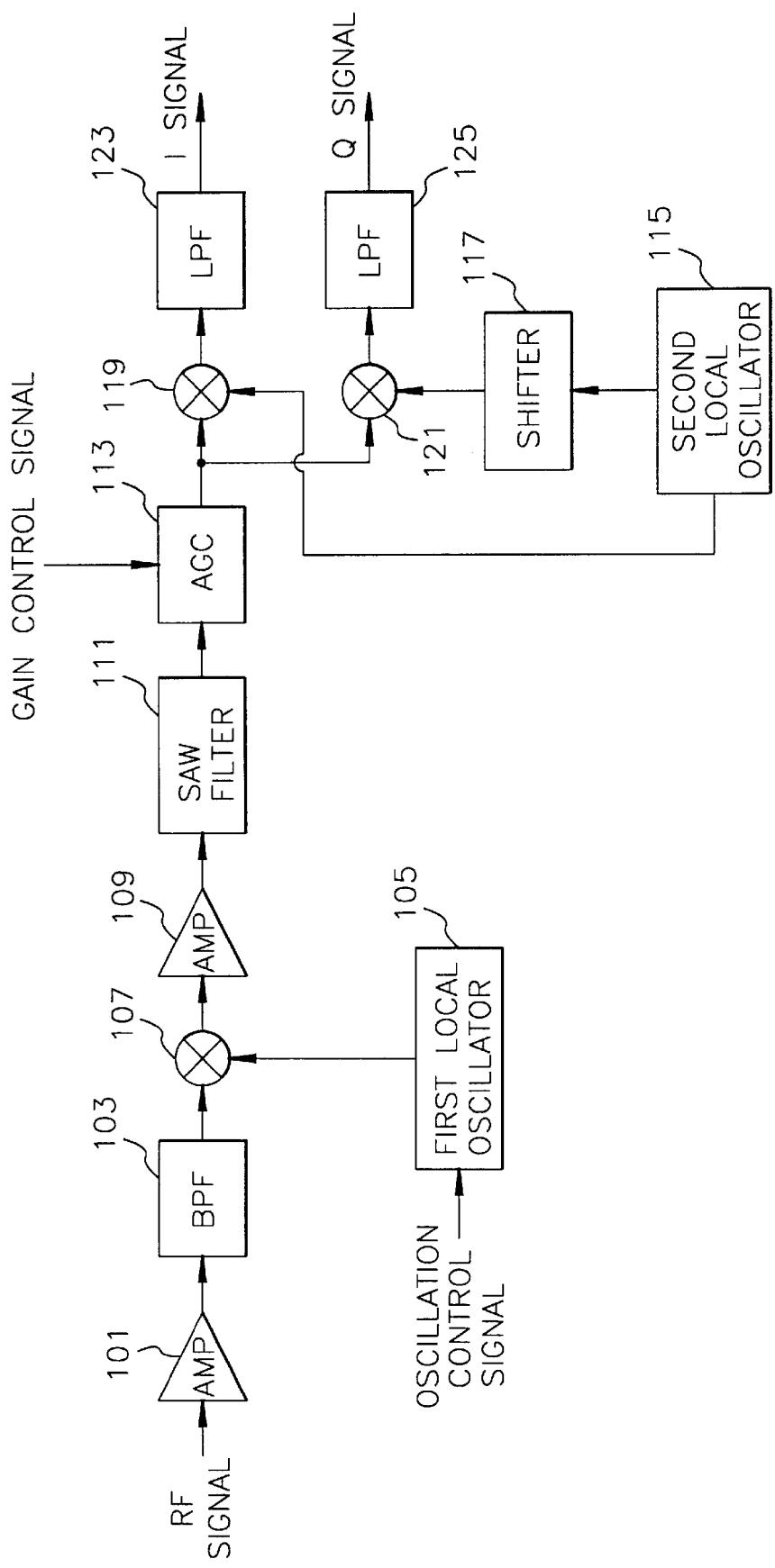
FIG. 1 shows a block diagram of a conventional satellite broadcast signal receiver.
Figure 2:
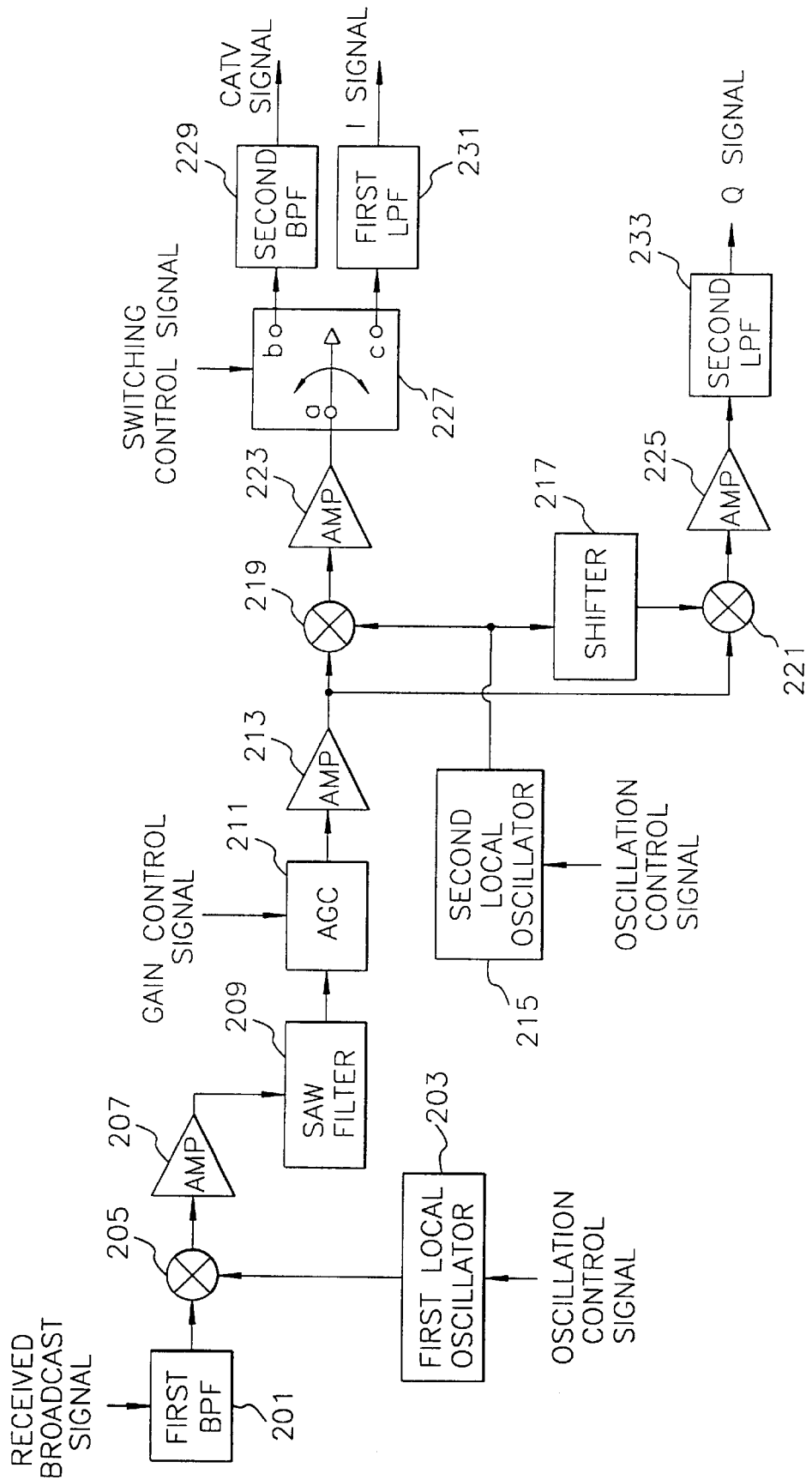
FIG. 2 illustrates a block diagram of the improved receiver in accordance with a preferred embodiment of the invention.

The improved broadcast signal receiver in accordance with the present invention is shown in the FIG. 2.

As shown in FIG. 2, the receiver comprises a first and a second BPFs 201, 229, a first and a second local oscillators 203, 215, a first, a second and a third mixers 205, 219 and 221, four amplifiers 207, 213, 223 and 225, a SAW filter 209, an AGC 211, a shifter 217, a switching block 227, a first, a second LPFs 231 and 233.

Received broadcast signals, e.g., the frequency converted satellite broadcast signal by the LNBC and the cable TV signal, are fed to the first BPF 201. The first BPF 201 filters the received broadcast signals with a predetermined bandpass filtering frequency which contains the converted RF signal and cable TV signal, for example, of frequency in the range of 54–2050 MHz to eliminate noises. The noise eliminated output signal of the first BPF 201 is fed to the first mixer 205. The first local oscillator 203 having a variable oscillation frequency of about at least 534.75–2530 MHz generates a first oscillation signal for tuning a required channel signal from the output signal of the first BPF 201 controlled by a oscillation control signal from a controller (not shown), e.g., a microprocessor when a channel to be tuned to is selected by a user. The first oscillation signal from the first local oscillator 203 is then fed to the first mixer 205.

The first mixer 205 receives the output signal from the first BPF 201 and the first oscillation signal from the first local oscillator 203 and mixes the output signal from the BPF 201 with the first oscillation signal to detect a difference component between the signals as a first IF signal of about 479.5 MHz. The detected first IF signal is amplified to a predetermined level by the amplifier 207, and then, is fed to the SAW filter 209.

The SAW filter 209 filters the output signal from the first mixer 205 provided through the amplifier 207 to generate a waveformed band signal of 32 MHz and provides same to the AGC 211. The waveformed band signal provided to the AGC 211 is then automatically gain controlled by a gain control signal from a video amplifier (not shown) for providing a fixed level of video signal at a output of a video detector (not shown), and is fed to the second mixer 219 and the third mixer 221 through the amplifier 213 for amplifying the gain controlled band signal.

On the other hand, in accordance with the present invention, the second local oscillator 215 must have two fixed oscillation frequencies, and selectively generates either a second oscillation signal of 435.5 MHz or a third oscillation signal of 479.5 MHz controlled by another oscillation control signal from the controller when a broadcast mode signal representing a type of the broadcast signal to tune to, either the satellite broadcast signal or the cable TV signal, is selected by the user and provides same to the second mixer 219 and/or the shifter 217. In case that the broadcast signal selected by the user is the cable TV signal, the second oscillation signal may be provided to the second mixer 219. On the other hand, if the satellite broadcast signal is selected by the user, then, the third oscillation signal is provided to the second mixer 219 and the shifter 217 controlled by the another oscillation control signal from the controller.

The second mixer 219 mixes the output signal of the amplifier 213 with the second or the third oscillation signal from the second local oscillator 215 to generate two kinds of IF signals, for example, a second IF signal of 44 MHz and a third IF signal of 0 MHz, respectively. The second or the third IF signal is amplified to a predetermined level by the amplifier 223 and then is fed to the switching block 227.

In accordance with the present invention, the switching block 227 couples the amplified second or the third IF signal to either the second BPF 229 or the first LPF 231 under the control of a switching control signal from the controller which depends on user's instruction. In detail, in case that the second IF signal is provided from the second mixer 219 through the amplifier 223, the switching block 227 couples the second IF signal to the second BPF 229. On the other hand, if the third IF signal is provided, the third IF signal is coupled to the first LPF 231 by the switching control signal from the controller.

If the second IF signal is provided to the second BPF 229 through the switching block 227, then the second BPF 229 filters the second IF signal with another predetermined bandpass filtering frequency to generate a baseband cable TV channel signal having 6 MHz bandwidth. The baseband cable TV channel signal may be used to demodulate in a following processor (not shown). On the other hand, if the third IF signal is provided to the first LPF 231 through the switching block 227, then the first LPF 231 filters the third IF signal with a predetermined cut-off frequency to generate 16 MHz baseband I signal.

Meanwhile, the shifter 217 receives the third oscillation signal from the second local oscillator 215 and shifts a phase of the third oscillation signal by 90°, and then, outputs the phase-shifted third oscillation signal to the third mixer 221. Subsequently, the third mixer 221 mixes the output signal of the SAW filter 209 through the AGC 211 and amplifier 213 with the phase-shifted third oscillation signal to generate a phase-shifted third IF signal and provides same to the second LPF 233 through the amplifier 225. The second LPF 233 filters the phase-shifted third IF signal with the predetermined cut-off frequency to generate 16 MHz baseband Q signal. The baseband I and Q signals also may be used to demodulate picture signals in a following processor (not shown).

In accordance with the preferred embodiment of the invention, it is possible to selectively tune and receive either a satellite broadcast signal or a cable TV signal by using the inventive receiver. Accordingly, a broadcast signal receiver for receiving both signals will reduce the manufacturing cost and the size thereof substantially by using the inventive receiver.

While the present invention has been described with respect to certain embodiments only, other modifications and variation may be made without departing from the spirit and scope of the present invention as set forth in the following claims.

What is claimed is:

1. A method for selectively receiving either a satellite broadcast signal or a cable television (TV) signal, the method comprising the steps of:
   (a) generating a first oscillation signal of a first predetermined oscillation frequency in response to a first oscillation control signal which is issued by a controller when a channel to be tuned to is selected by a user;
   (b) receiving the first oscillation signal and either one of the satellite broadcast signal and the cable TV signal and mixing the first oscillation signal with either one of the satellite signal and cable TV signal to provide a first mixed signal having a first intermediate frequency (IF) signal;
   (c) filtering the first mixed signal with a first predetermined filtering frequency to produce a waveformed band signal;
   (d) selectively generating a second oscillation signal of a second predetermined oscillation frequency or a third oscillation signal of a third predetermined oscillation frequency in response to a second oscillation control signal which is issued by the controller when a broadcast mode signal representing a type of the broadcast signal to tune to, either the satellite broadcast signal or the cable TV signal, is selected by the user;
   (e) receiving the waveformed band signal and either the second or the third oscillation signal and mixing the waveformed band signal with either the second or the third oscillation signal to output either a second mixed signal having a second IF signal or a third mixed signal having a third IF signal;
   (f) in response to the broadcast mode signal, selectively filtering the second mixed signal with a second or a third predetermined filtering frequency to obtain a channel signal of the cable TV signal or a baseband I signal of the satellite broadcast signal which corresponds to the selected channel; and
   (g) shifting a phase of the third oscillation signal by a predetermined degrees to issue a phase-shifted third oscillation signal and mixing the waveformed band signal with the phase-shifted third oscillation signal to generate a phase-shifted mixed signal having a phase-shifted third IF signal and filtering the phase-shifted mixed signal with the third predetermined filtering frequency to obtain a baseband Q signal of the satellite broadcast signal corresponding to the selected channel.

2. The method of claim 1, wherein the waveformed band signal is obtained by using a surface acoustic wave filter.

3. The method of claim 1, wherein the first predetermined oscillation frequency has the bandwidth of 534.75–2530 MHz.

4. The method of claim 1, wherein the second and the third oscillation frequencies are 435.5 MHz and 479.5 MHz, respectively.

5. The method of claim 1, wherein said step (b) includes a step of filtering the satellite broadcast signal or the cable TV signal with a predetermined bandpass filtering frequency.

6. The method of claim 5, wherein said predetermined bandpass filtering frequency is in the range of 54–2050 MHz.

7. An apparatus for selectively receiving either a satellite broadcast signal or a cable television (TV) signal, the apparatus comprising:

means for generating a first oscillation signal of a first predetermined oscillation frequency in response to a first oscillation control signal which is issued by a controller when a channel to be tuned to is selected by a user;

means for receiving the first oscillation signal and either one of the satellite broadcast signal and the cable TV signal and mixing the first oscillation signal with either one of the satellite signal and cable TV signal to provide a first mixed signal having a first intermediate frequency (IF) signal;

means for filtering the first mixed signal with a first predetermined filtering frequency to produce a waveformed band signal;

means for selectively generating a second oscillation signal of a second predetermined oscillation frequency or a third oscillation signal of a third predetermined oscillation frequency in response to a second oscillation control signal which is issued by the controller when a broadcast mode signal representing a type of the broadcast signal to tune to, either the satellite broadcast signal or the cable TV signal, is selected by the user;

means for receiving the waveformed band signal and either the second or the third oscillation signal and mixing the waveformed band signal with either the second or the third oscillation signal to generate either a second mixed signal having a second IF signal or a third mixed signal having a third IF signal;

means, in response to the broadcast mode signal, for selectively filtering the second mixed signal with a second or a third predetermined filtering frequency to obtain a channel signal of the cable TV signal or a baseband I signal of the satellite broadcast signal which corresponds to the selected channel; and means for shifting a phase of the third oscillation signal by a predetermined degrees to issue a phase-shifted third oscillation signal and mixing the waveformed band signal with the phase-shifted third oscillation signal to generate a phase-shifted mixed signal having a phase-shifted third IF signal and filtering the phase-shifted mixed signal with the third predetermined filtering frequency to obtain a baseband Q signal of the satellite broadcast signal corresponding to the selected channel.

8. The apparatus of claim 7, wherein the waveformed band signal is obtained by using a surface acoustic wave filter.

9. The apparatus of claim 7, wherein the first predetermined oscillation frequency has the bandwidth of 534.75–2530 MHz.

10. The apparatus of claim 7, wherein the second and the third oscillation frequencies are 435.5 MHz and 479.5 MHz, respectively.

11. The apparatus of claim 7, wherein said means for providing the first mixed signal includes a bandpass filter for filtering the satellite broadcast signal or the cable TV signal with a predetermined bandpass filtering frequency.

12. The apparatus of claim 11, wherein said predetermined bandpass filtering frequency is in the range of 54–2050 MHz.

13. A selectively tunable apparatus for receiving a Radio Frequency (RF) signal and producing either a satellite broadcast signal or a cable television signal from the RF signal based on a user's selection, the apparatus comprising:
    a first local oscillator configured to output a first oscillation signal;
    first circuitry configured to mix the first oscillation signal with the RF signal thereby form a first mixed signal;
    a second local oscillator configured to selectively output either a second oscillation signal or a third oscillation signal in response to an oscillation control signal, wherein said second oscillation signal is associated with the cable television signal, and the third oscillation signal is associated with the satellite broadcast signal;
    second circuitry arranged to mix the output of the second local oscillator with the first mixed signal to thereby produce a second mixed signal; and
    a switch configured selectively direct the second mixed signal into either a first filter to form the cable television signal or a second filter to form the satellite broadcast signal, in response to a switching control signal,
    wherein:
        the oscillation control signal and the switching control signal are established in response to a user-selected broadcast mode signal that represents a type of broadcast signal to which the apparatus has been selectively tuned.

14. The apparatus according to claim 13, further comprising third circuitry arranged to mix a phase-shifted output of the second local oscillator with said first mixed signal to thereby produce a third mixed signal.

15. The apparatus according to claim 13, wherein the first oscillation signal has a frequency range of 534.75–2530 MHz.

16. The apparatus according to claim 15, wherein the second oscillation signal has a frequency of 435.5 MHz and the third oscillation signal has a frequency of 479.5 MHz.

17. The apparatus according to claim 13, wherein the first circuitry comprises a bandpass filter configured to filter the RF signal with a predetermined bandpass filtering frequency and output a bandpass-filtered RF signal.

18. The apparatus according to claim 17, wherein said predetermined bandpass filtering frequency is in the range of 54–2050 MHz.

19. The apparatus according to claim 17, wherein the first circuitry further comprises a mixer configured to mix the bandpass-filtered RF signal with the first oscillation signal.

20. The apparatus according to claim 19, wherein the first circuitry further comprises a surface acoustic wave filter configured to filter an amplified version of an output of the mixer.

* * * * *